United States Patent
Yang et al.

(10) Patent No.: US 9,246,624 B1
(45) Date of Patent: Jan. 26, 2016

(54) LOW NOISE OPTICAL PHASE-SENSITIVE AMPLIFIER FOR DUAL-POLARIZATION MODULATION FORMATS

(71) Applicant: Fujitsu Limited, Kawasaki-shi, Kanagawa (JP)

(72) Inventors: Jeng-Yuan Yang, Garland, TX (US); Yoichi Akasaka, Allen, TX (US); Motoyoshi Sekiya, Richardson, TX (US)

(73) Assignee: Fujitsu Limited, Kawasaki-shi (JP)

( * ) Notice: Subject to any disclaimer, the term of this patent is extended or adjusted under 35 U.S.C. 154(b) by 0 days.

(21) Appl. No.: 14/478,717

(22) Filed: Sep. 5, 2014

(51) Int. Cl.
*H04B 10/02* (2006.01)
*H04J 14/02* (2006.01)
*H04B 10/564* (2013.01)
*H04B 10/532* (2013.01)
*H04Q 11/00* (2006.01)

(52) U.S. Cl.
CPC .......... *H04J 14/0221* (2013.01); *H04B 10/532* (2013.01); *H04B 10/564* (2013.01); *H04Q 11/0005* (2013.01); *H04Q 2011/0016* (2013.01)

(58) Field of Classification Search
CPC .. H04B 10/29; H04B 10/291; H04B 10/2912; H04B 10/2914; H04B 10/2916; H04B 10/2918; H04B 10/293; H04B 10/2931; H04B 10/2933; H04B 10/2935; H04B 10/294; H04B 10/2941; H04B 10/2942; H04B 10/296; H04B 10/297
USPC ......... 398/173, 175, 176, 177, 178, 180, 181, 398/33, 34, 38; 359/333, 341, 341.3, 337, 359/344, 337.5, 332, 326
See application file for complete search history.

(56) References Cited

U.S. PATENT DOCUMENTS

| | | | |
|---|---|---|---|
| 7,483,203 B2 * | 1/2009 | McKinstrie | H01S 3/06758 359/333 |
| 8,270,842 B2 * | 9/2012 | Watanabe | G02F 1/3534 398/152 |

OTHER PUBLICATIONS

"Parametric Amplification;" RP Photonics Encyclopedia, Encyclopedia of Laser Physics and Technology; http://rp-phhotonics.com/parametric_amplification.html; 5 pages (downloaded on Aug. 27, 2014).
"Four-wave Mixing;" RP Photonics Encyclopedia, Encyclopedia of Laser Physics and Technology; http://rp-phhotonics.com/four_wave_mixing.html; 2 pages (downloaded on Aug. 27, 2014).

* cited by examiner

*Primary Examiner* — Hanh Phan
(74) *Attorney, Agent, or Firm* — Baker Botts L.L.P.

(57) ABSTRACT

A method and system for amplifying optical signals includes generating idler signals for input signals using a pump signal at a first non-linear element (NLE). Phase and amplitude regulation is performed using the output from the first NLE. Optical power monitoring of the input signals may be used for power equalization. The phase regulation may use input from a feed forward phase-power monitoring of the output phase-sensitive amplified signal. After phase regulation the phase-sensitive amplified signal is generated at a second NLE using the pump signal. Optical power monitoring of the input signals may be used for power equalization and other control functions to achieve low-noise operation.

33 Claims, 10 Drawing Sheets

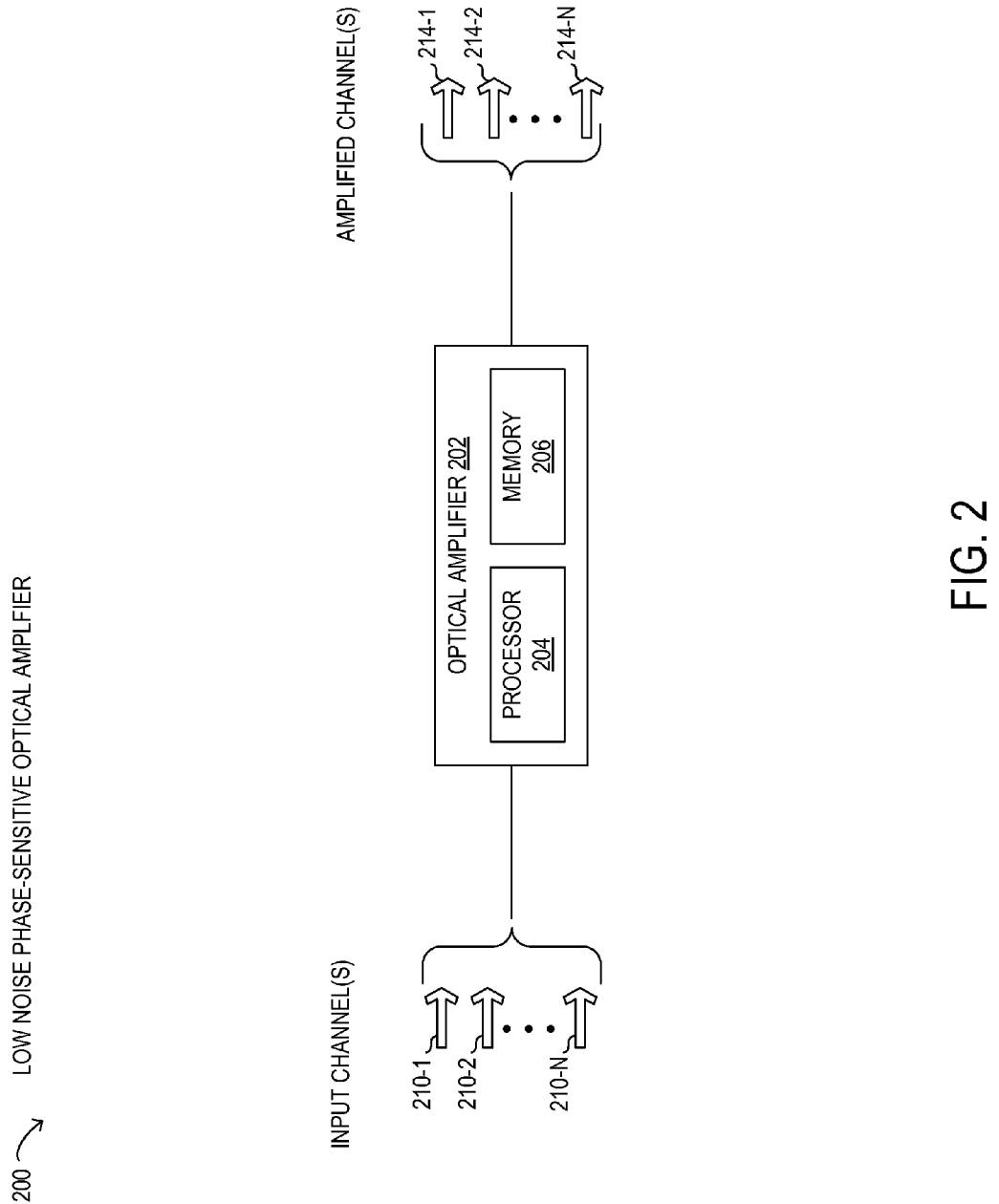

LOW NOISE OPTICAL PHASE-SENSITIVE AMPLIFIER FOR DUAL-POLARIZATION MODULATION FORMATS

CROSS-REFERENCE TO RELATED APPLICATION

This application is related to U.S. application Ser. No. 13/741,177 filed Jan. 14, 2013, entitled "OPTICAL PHASE-SENSITIVE AMPLIFIER FOR DUAL-POLARIZATION MODULATION FORMATS", which is hereby incorporated by reference.

BACKGROUND

1. Field of the Disclosure

The present disclosure relates generally to optical communication networks and, more particularly, to low noise optical phase-sensitive amplifiers for dual polarization modulation formats.

2. Description of the Related Art

Telecommunication, cable television and data communication systems use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying ("PSK"), frequency-shift keying ("FSK"), amplitude-shift keying ("ASK"), and quadrature amplitude modulation ("QAM").

In PSK, the information carried by the optical signal may be conveyed by modulating the phase of a reference signal, also known as a carrier wave. The information may be conveyed by modulating the phase of the signal itself using differential phase-shift keying ("DPSK"). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK ("BPSK" or "2-PSK") using two phases at 0° and 180° (or 0 and $\pi$) on the constellation diagram; or quadrature PSK ("QPSK", "4-PSK", or "4-QAM") using four phases at 0°, 90°, 180°, and 270° (or 0, $\pi/2$, $\pi$, and $3\pi/2$). Phases in such signals may be offset. Each of 2-PSK and 4-PSK signals may be arranged on the constellation diagram.

M-PSK signals may further be polarized using techniques such as dual-polarization QPSK ("DP-QPSK"), wherein separate m-PSK signals are multiplexed by orthogonally polarizing the signals. M-QAM signals may also be polarized using techniques such as dual-polarization 16-QAM ("DP-16-QAM"), wherein separate m-QAM signals are multiplexed by orthogonally polarizing the signals.

Optical networks may also include various optical elements, such as amplifiers, dispersion compensators, multiplexer/demultiplexer filters, wavelength selective switches, optical switches, couplers, etc. to perform various operations within the network. In particular, optical networks may include costly optical-electrical-optical (O-E-O) regeneration at reconfigurable optical add-drop multiplexers (ROADMs) when the reach of an optical signal is limited in a single optical path.

As data rates for optical networks continue to increase, reaching up to 1 terabit/s (1 T), the demands on optical signal-to-noise ratios (OSNR) also increase, for example, due to the use of advanced modulation formats, such as QAM and PSK with dual polarization. In particular, noise accumulations resulting from cascading of optical amplifiers in an optical network operating at very high data rates may limit the reach of an optical signal at a desired level of OSNR and may result in an increased number of O-E-O regenerations, which is economically disadvantageous.

SUMMARY

In one aspect, a disclosed method for low noise phase-sensitive optical amplification includes receiving a first optical signal for amplification and generating a second optical signal including a pump signal and the first optical signal. The method may include transmitting the second optical signal through a first non-linear element to generate a third optical signal. The third optical signal may include an idler signal. The method may include equalizing a power level of the third optical signal and applying a phase shift to the third optical signal to generate a fourth optical signal. The phase shift may be indicative of a phase difference to a maximum power level of a fifth optical signal generated after phase-sensitive amplification. The method may further include transmitting the fourth optical signal through a second non-linear element to perform the phase-sensitive amplification. The phase-sensitive amplification may result in the fifth optical signal.

Additional disclosed aspects for low noise phase-sensitive optical amplification include an optical amplifier and an optical communication system, as described herein.

BRIEF DESCRIPTION OF THE DRAWINGS

For a more complete understanding of the present invention and its features and advantages, reference is now made to the following description, taken in conjunction with the accompanying drawings, in which:

FIG. 2 is a block diagram of selected elements of an embodiment of an optical amplifier;

DESCRIPTION OF PARTICULAR EMBODIMENT(S)

Figure 1:
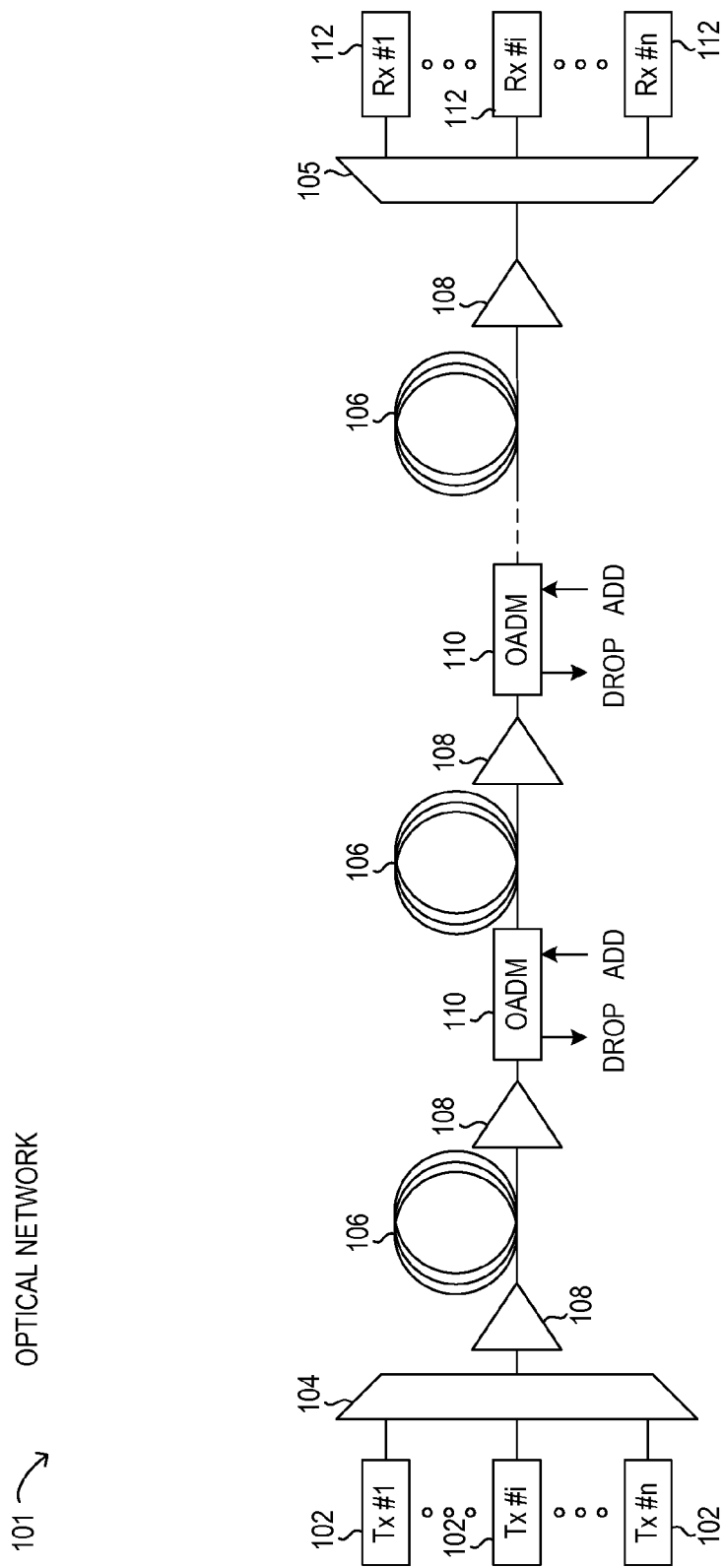
FIG. 1 is a block diagram of selected elements of an embodiment of an optical network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Referring now to the drawings, FIG. 1 illustrates an example embodiment of optical network 101, which may represent an optical communication system. Optical network 101 may include one or more optical fibers 106 to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a Single-Mode Fiber ("SMF"), Enhanced Large Effective Area Fiber ("E-LEAF"), or TrueWave® Reduced Slope ("TW-RS") fiber.

Optical network 101 may include devices to transmit optical signals over optical fibers 106. Information may be transmitted and received through optical network 101 by modulation of one or more wavelengths of light to encode the information on the wavelength. In optical networking, a wavelength of light may also be referred to as a channel that is included in an optical signal (also referred to herein as a "wavelength channel"). Each channel may carry a certain amount of information through optical network 101.

To increase the information capacity and transport capabilities of optical network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may transmit disparate channels using WDM or some other suitable multi-channel multiplexing technique, and to amplify the multi-channel signal.

Optical network 101 may include one or more optical transmitters (Tx) 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before and/or after certain lengths of fiber 106. Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device to add and/or drop optical signals (i.e., at individual wavelengths) from fibers 106. After passing through an OADM 110, an optical signal may travel along fibers 106 directly to a destination, or the signal may be passed through one or more additional OADMs 110 and/or optical amplifiers 108 before reaching a destination.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels.

In FIG. 1, optical network 101 may also include receivers 112 coupled to demultiplexer 105. Each receiver 112 may receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

Additionally, polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and/or an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, and/or a hierarchical network topology.

As discussed above, the amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information can be transmitted over an optical network may be the bit rate of transmission. The higher the bit rate, the greater the transmitted information capacity. Achieving higher bit rates may be limited by the availability of wide bandwidth electrical driver technology, digital signal processor technology and increase in the required OSNR for transmission over optical network 101.

In operation of optical network 101, as data rates approach 1 T a correspondingly high OSNR becomes desirable to maintain economic feasibility by avoiding excessive numbers of O-E-O regenerators. One source of OSNR reduction is the noise accumulation resulting from cascaded optical amplifiers 108 at various points in the transmission path. For an optical amplifier, OSNR may be represented as a noise figure (NF), given by Equation 1, where $OSNR_{in}$ is the input OSNR, $OSNR_{out}$ is the output OSNR, and dB is decibels.

$$NF=10\log(OSNR_{in}/OSNR_{out})=OSNR_{in}\,[dB]-OSNR_{out}\,[dB] \quad \text{Equation (1)}$$

Current designs for optical amplifiers may have limitations in noise reduction capability. For example, EDFAs may be limited to a noise figure of about NF ≥3 dB. Raman amplifiers may have a smaller noise figure, but may carry a risk of fiber fusion that can burn an entire fiber link. Phase-insensitive optical parametric amplifiers (OPA) may experience a quantum limit of the noise figure given by NF=3 dB.

As will be described in further detail, methods and systems are disclosed herein for implementing a low noise phase-sensitive optical amplifier (PSA) that may provide for a lower noise figure than previous optical amplifier designs. The low noise PSA disclosed herein may provide full compensation for signal impairments, such as chromatic dispersion (CD) and polarization mode dispersion (PMD), on all amplified channels. The low noise PSA disclosed herein may further monitor signal quality of WDM input channels. The low noise PSA disclosed herein may also stabilize the phase for each amplified channel and idler conjugate pair. The low noise PSA disclosed herein may still further achieve low-noise optical amplification on input channels employing orthogonal polarization. The low noise PSA disclosed herein may also achieve polarization-insensitive low-noise amplification. The low noise PSA disclosed herein may still further provide sufficient optical bandwidth and flexible hardware to accommodate various changes in the number and configuration of the input optical channels.

Referring now to FIG. 2, selected elements of an example embodiment of optical system 200 to provide low-noise optical phase-sensitive amplification for dual-polarization modulation formats are depicted. As shown, optical system includes optical amplifier 202, which may represent selected elements of an embodiment of amplifier 108 (see FIG. 1). In one embodiment, optical system 200 may include components with a wavelength selective processor (WSP) to conduct optical signal amplification. Such implication may be performed on any suitable signal such as a QPSK signal. In a further embodiment, such WSPs may be reconfigurable. In another embodiment, optical system 200 may include bi-directional phase-sensitive amplification to conduct optical phase-sensitive amplification for dual-polarization modulation formats. In a further embodiment, such phase-sensitive amplification may be degenerate. One or more optical amplifiers, such as optical amplifier 202, may conduct the optical phase-sensitive amplification for dual-polarization modulation formats.

Optical amplifier 202 may amplify optical signals in optical system 200. Optical system 200 may include input channels (i.e., optical signals) 210 to be amplified as output channels 214 by optical amplifier 202. Channels 210, 214 may be transmitted by optical system 200 over optical network 101 (see FIG. 1). Optical network 101 may include optical amplifier 202 in any suitable arrangement, such as in a transmission line between two optical components or in a ROADM. Furthermore, optical amplifier 202 may operate as a stand-alone device or as part of another piece of optical transmission equipment. As shown, input channels 210 comprise N number of channels, designated 210-1, 210-2, and so on, up to 210-N. Amplified channels 214 output by optical amplifier 202 correspondingly comprise N number of channels, designated 214-1, 214-2, and so on, up to 214-N. It is noted that N may have any value greater than or equal to 1. When N=1, input channels 210 may comprise a single channel, even though input channels 210 is used herein in the plural form.

Figure 3A:
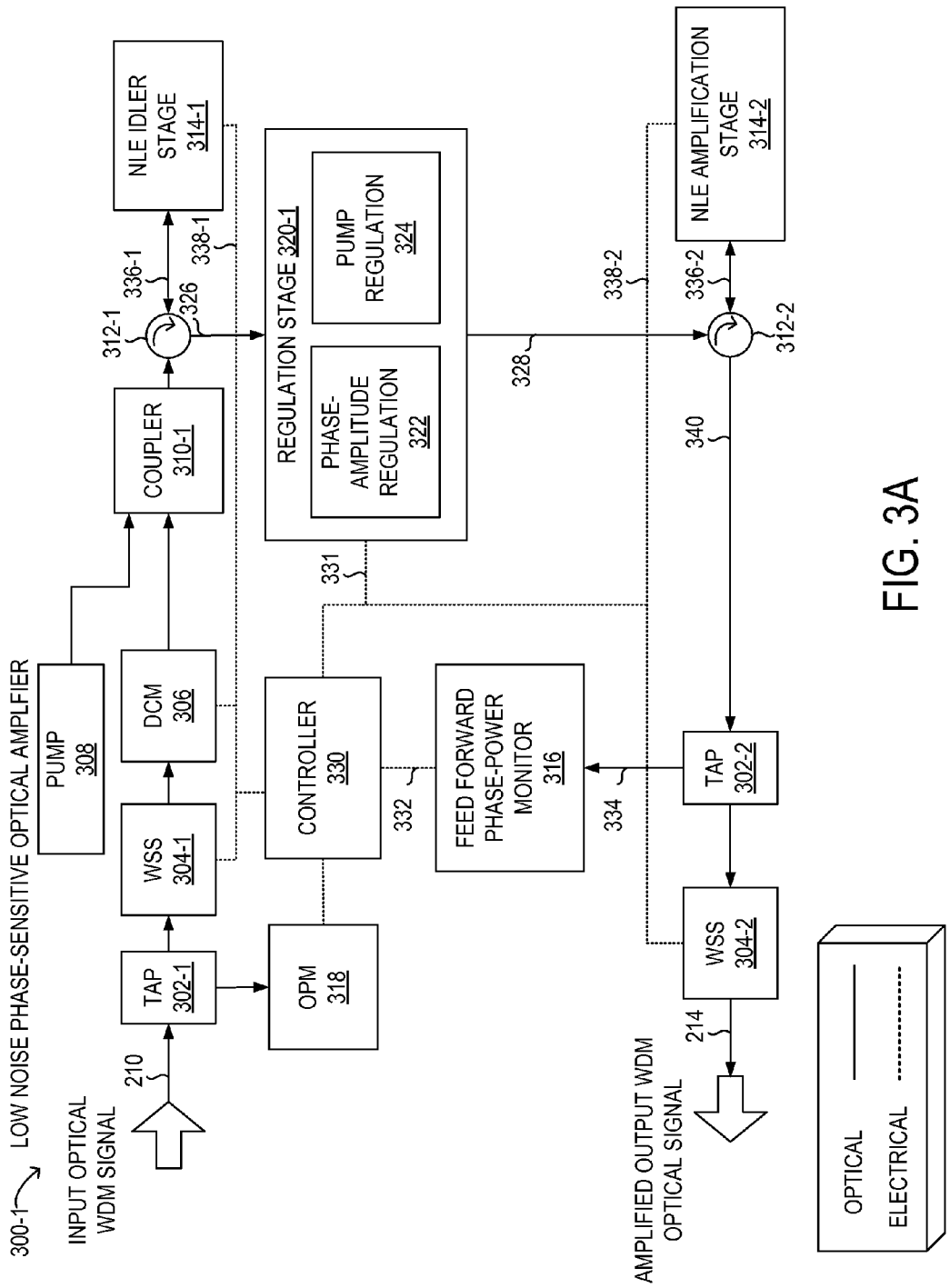
FIG. 3A is a block diagram of selected elements of an embodiment of an optical amplifier.
Figure 3B:
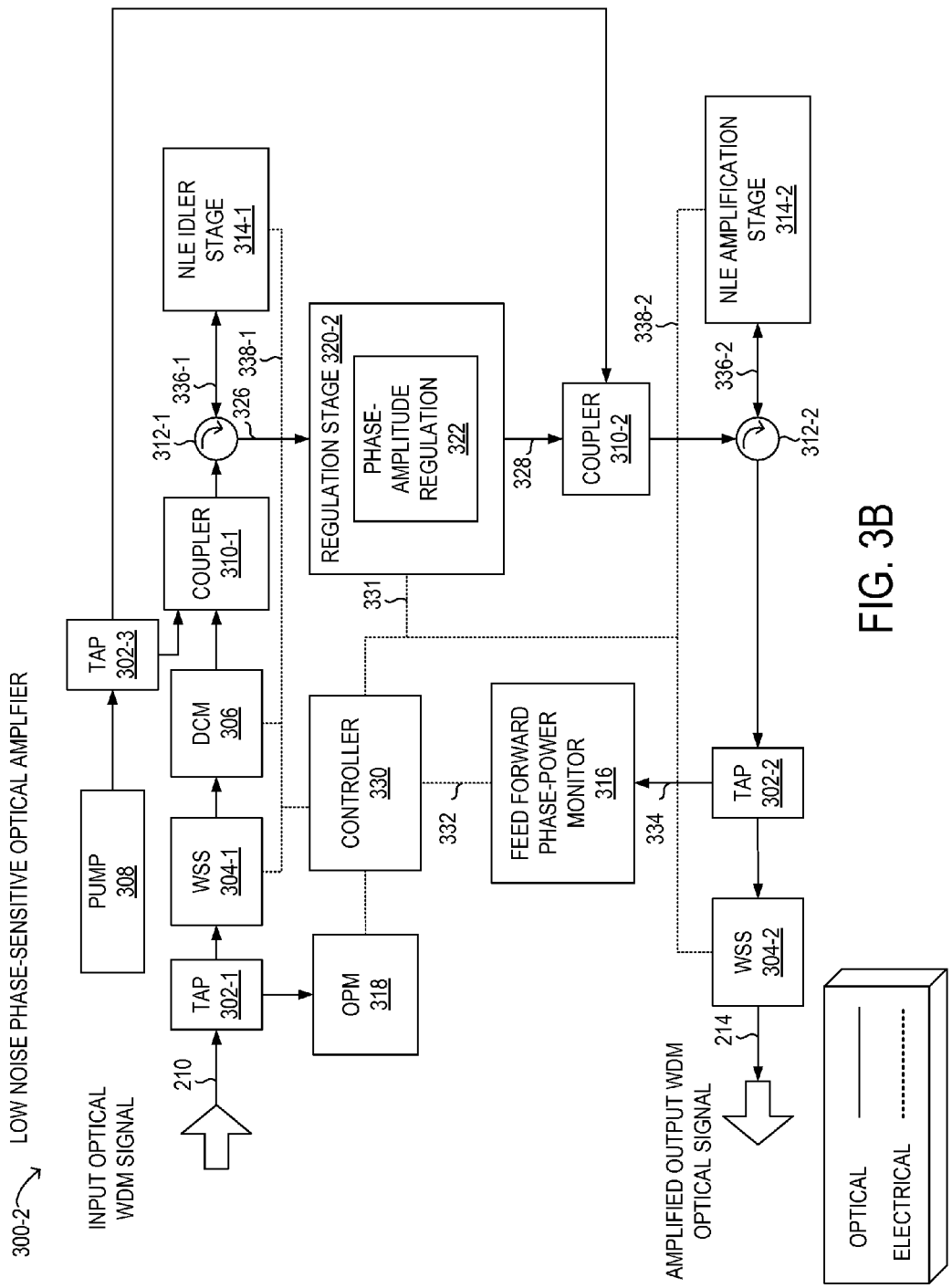
FIG. 3B is a block diagram of selected elements of an embodiment of an optical amplifier.

Optical amplifier 202 may include any suitable number and kind of components to perform optical signal amplification, as described herein. Example implementations of all or part of optical amplifier 202 may include low-noise optical amplifier 300, as shown in FIGS. 3A and 3B. Optical amplifier 202 may include a processor 204 coupled to a memory 206. In one embodiment, to perform optical signal amplification, optical amplifier 202 may include components for configuring optical amplifier 202 to monitor, adjust, and pre-compensate input signals and other system characteristics such as pump signal to adjust signal information such as phase, power and chromatic dispersion. In another embodiment, to perform optical signal amplification, optical amplifier 202 may include components for performing one-pump optical four-wave mixing (FWM). In a further embodiment, the FWM may be accomplished by passing the input signal, or filtered portions thereof, bi-directionally through a non-linear optical element (NLE). In yet another embodiment, passing such signals bi-directionally may include passing an X-polarization component signal in a given direction through the NLE and simultaneously passing a Y-polarization component signal in the opposite direction through the NLE.

Optical amplifier 202 may utilize two optical processing stages. In a first stage, optical amplifier 202 may generate an idler conjugate signal (also simply referred to as an "idler signal" or "idler") of input channels 210. In a second stage, optical amplifier 202 may conduct phase-sensitive FWM. Such FWM may transfer the energy from a pump signal to the input channels 210 and to the idler signals.

Specifically, optical amplifier 202 may include means for generating pump laser signals, which may be used in an NLE idler stage to create idler signals that are then added to the input signal. The idler signals may represent respective conjugate wavelengths to input channels 210. Optical amplifier 202 may then be configured to conduct FWM in an NLE amplification stage that amplifies input channels 210 based on the symmetric idler signals. The wavelengths of input channels 210 and idler signals may be equidistant (or nearly equidistant) from a wavelength of the pump signal. The equidistant or nearly equidistant wavelengths may include wavelengths that are, for example, perfectly equidistant or approximately equidistant such that overall performance may not be impacted significantly. Such approximately equidistant wavelengths may include wavelength differences between the idler signals and the pump signal that are approximately equal, or wavelength differences between the pump signal and input channels 210 that are approximately equal. In one embodiment, approximately equal wavelength differences may include wavelength differences that vary less than ten percent between the wavelength differences. Idler signals may include a phase that may be the inverse of the phase of input channels 210.

Input channels 210 may include an optical signal modulated through any suitable method, such as m-QAM or m-PSK. Input channels 210 may include dual-polarization components. Optical amplifier 202 may be configured to accept dual-polarization signals in any suitable manner. Optical amplifier 202 may be configured to split input channels 210 into X-polarization and Y-polarization components. Such split components may be processed independently. In one embodiment, a single NLE may be used for bi-directional signal conversion of the X-polarization and Y-polarization components. In another embodiment, a single NLE may be used for bi-directional non-degenerate FWM for phase-sensitive amplification of the X-polarization and Y-polarization components. In yet another embodiment, the X-polarization and Y-polarization components may share the elements of the first NLE idler stage and the second NLE amplification stage, such that crosstalk and path mismatch are avoided between the two polarizations.

Optical amplifier 202 may include optical performance monitoring (OPM), a controller, and WSPs to dynamically control the operation of optical amplifier 202. Information regarding input channels 210, such as wavelength, power, residual chromatic dispersion, polarization mode dispersion, and OSNR may be monitored. Furthermore, information regarding the operation and output of the components of optical amplifier 202 may be monitored (see also FIGS. 3A and 3B). According to monitored information, phase and power levels of optical signals at various portions of optical amplifier 202 may be dynamically changed, such as the phase and power levels of the output signal, pump signal, and idler signals.

Optical amplifier 202 may be configured to accept WDM signals. The first NLE idler stage of optical amplifier 202 may be configured to generate idler signals for each WDM component of input channels 210. Furthermore, the second NLE amplification stage of optical amplifier 202 may be configured to perform FWM for each pair of signals within input channels 210 and a respective idler signal counterpart generated from the first NLE idler stage. When WDM signals are used in optical amplifier 202, each idler signal may be equidistant (or nearly equidistant) in wavelength from the pump signal with respect to a wavelength of a corresponding input signal in input channels 210.

Processor 204 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 204 may interpret and/or execute program instructions and/or process data stored in memory 206 to carry out some or all of the operation of optical amplifier 202. Memory 206 may be configured in part or whole as application memory, system memory, or both. Memory 206 may include any system, device, or apparatus configured to hold and/or house one or more memory modules. Each memory module may include any system, device or apparatus configured to retain program instructions and/or data for a period of time (e.g., computer-readable media). Memory 206 may be non-transitory. One or more portions or functionality of optical amplifier 202 may be implemented by the execution of instructions resident within memory 206 by processor 204.

Referring now to FIG. 3A, selected elements of an embodiment of low noise phase-sensitive optical amplifier 300-1 to provide low-noise optical phase-sensitive amplification are depicted. In one embodiment, optical amplifier 300-1 may support dual-polarization modulation formats. In FIG. 3A, optical amplifier 300-1 is shown in a schematic representation and is not drawn to scale. It is noted that, in different embodiments, optical amplifier 300-1 may be operated with additional or fewer elements. In FIG. 3A, optical amplifier 300-1 is described with respect to input optical WDM signals represented by N number of input channels 210 (see FIG. 2). Although fixed grid WDM input channels 210 are shown herein for descriptive purposes, it is noted that other spectral channel arrangements, such as flex-grid channel spacing, may be practiced in particular embodiments. Also in FIG. 3A, solid lines represent optical paths, while dashed lines represent electrical connections.

In FIG. 3A, input channels 210 are provided for optical amplification in the propagation direction shown. In certain embodiments, a Raman amplifier (not shown) may be used to provide a small gain for compensating certain kinds of dispersion compensation. Thus, a Raman pump (not shown) may provide optical energy at the input to optical amplifier 300-1 in a reverse direction to the propagation direction of input channels 210, which may also be referred to as "pre-emphasis stage".

Optical amplifier 300-1 may include a mechanism for accepting an input signal such as input channels 210. Input channels 210 may include a plurality of WDM channels, each of which may correspond to a different wavelength denoted by $\alpha_j$. Furthermore, each such channel may correspond to a different modulation format. For each channel, input channels 210 may include an X-polarization and a Y-polarization component (see also FIG. 7A).

At tap 302-1, input channels 210 may be split and directed to WSS 304-1, which may be used to select a desired group of channels among input channels 210, and OPM 318. For example, depending on an optical bandwidth supported by optical amplifier 300-1, a number of channels in input channels 210 may be limited for processing at WSS 304-1. In other embodiments, WSS 304-1 may pass all input channels 210 for processing. Thus, WSS 304-1 may select the desired channels of input channels 210 to be processed, for example, on a per-wavelength basis. WSS 304-1 may be implemented in any suitable manner, such as by active or passive configurable filters, array waveguides, electromechanical devices, or crystals. As shown, WSS 304-1 is communicatively coupled to controller 330 for control and monitoring purposes using an electrical connection. Controller 330 may be configured to adjust the operation of WSS 304-1 to, for example, select what portion of input channels 210 are to be amplified by optical amplifier 300-1.

As shown, optical amplifier 300-1 includes optical performance monitoring (OPM) 318, which received input channels 210 and is communicatively coupled to controller 330 for control and monitoring purposes using an electrical connection. OPM 318 may monitor information regarding input channels 210, such as wavelength, power, residual chromatic dispersion, polarization mode dispersion, and OSNR. Controller 330 may receive monitoring information from OPM 318 and may adjust various other components accordingly.

WSS 304-1 may send optical signals to dispersion compensation module (DCM) 306. DCM 306 may include compensators for chromatic dispersion (CD), polarization-mode dispersion (PMD), or other types of dispersion compensation. DCM 306 may compensate for CD and PMD in input channels 210. DCM 306 may be implemented in any suitable manner, such as a module, optical device, or electronic device. DCM 306 may be communicatively coupled to controller 330. Controller 330 may be configured to adjust the operation of DCM 306 based upon, for example, the nature or kind of input channels 210, detected output of optical amplifier 300-1, or detected output of DCM 306.

DCM 306 may send optical signals to coupler 310-1, which also receives a pump signal from pump 308. In various embodiments, pump 308 may include a tunable optical source, such as a tunable laser. Pump 308 may be communicatively coupled to controller 330. Controller 330 may be configured to adjust the wavelength, power, phase, or other aspects of the operation of pump 308 based upon, for example, the nature or kind of input channels 210, detected output of pump 308, or detected output of optical amplifier 300-1. In certain instances, pump 308 may include stimulated Brillouin scattering (SBS) suppression to compensate for density variations that may cause undesired scattering in an NLE. Furthermore, pump 308 may polarize the pump signal with respect to each of the dual-polarizations in input channels 210.

Coupler 310-1 may combine input channels 210 with the pump signal generated by pump 308 and provide the combined output (see also FIG. 7B) to optical circulator 312-1. Optical circulator 312-1 may include any suitable mechanism for selective routing of inputs and outputs according to the present disclosure. For example, optical circulator 312-1 may include a plurality of sequentially identified optical input-output ports and may allow light to travel in only one direction. An optical signal entered into a first port will exit the second port, while a signal entering the second port will exit the third port. The sequential identification of the first, second, and third port, and thus the input-output behavior, may be schematically identified with a clockwise or counter-clockwise indicator. In the example of FIG. 3A, optical circulator 312-1 operates in clockwise fashion such that the input from coupler 310-1 is output via optical link 336-1 to NLE idler stage 314-1, and input from NLE idler stage 314-1 is output to regulation stage 310-1 via optical link 326.

At NLE idler stage 314-1, idler signals symmetric in wavelength about the pump signal to input channels 210 are added, as described in further detail below with respect to FIG. 6 (see also FIG. 7C). Based on what is selected by WSS 304-1 for input to optical amplifier 300-1, NLE idler stage 314-1 may add corresponding idler signals, as instructed by controller 330 via control link 338-1. NLE idler stage 314-1 may operate in a polarization insensitive manner by separating each polarization component and sending each polarization component in a different propagation direction through a NLE. At the output of NLE idler stage 314-1, the amplitude of input channels 210 and idler signals will not yet be amplified, and may be relatively weak in amplitude, corresponding to an input level of optical amplifier 300-1. It is noted that some undesirable differences in amplitude between input channels 210 and idler signals may be present at the output of NLE idler stage 314-1. Also, the pump signal may be adulterated to a degree due to optical wavelength interaction or mixing between input channels 210 wavelengths and idler signal wavelengths when emerging from NLE idler stage 314-1.

In FIG. 3A, optical link 326 sends the combined input channels 210, pump signal, and idler signals to regulation stage 320-1. As shown, regulation 320-1 may implement phase-amplitude regulation 322, described in further detail with respect to FIGS. 4A and 4B. In general, phase-amplitude regulation 322 may optimally adjust a total phase of input channels 210 and the idler signals, in conjunction with feed forward phase-power monitor 316, which monitors phase and power level of the amplified outputs from NLE amplification stage 314-2. Specifically, feed forward phase-power monitor 316 may measure the amplitude of optical signals relative to an optimal phase and may determine a desired phase to achieve a maximum power level. In other words, a phase offset to the maximum power level will be monitored at feed forward phase-power monitor 316 and sent to controller 330, which will provide control information via control link 331 to regulation stage 320. In this manner, controller 330 may continuously operate a feed-forward regulation loop (including phase-amplitude regulation 322 and feed forward phase-power monitor 316) for precise phase-power control to enable low noise operation of NLE amplification stage 314-2.

As shown, in FIG. 3A, regulation stage 320-1 also includes pump regulation 324, which may provide for pump regeneration to improve the quality of the pump signal for improved amplification during subsequent NLE amplification stage 314-2. Specifically, pump regulation 324 may remove adulterations in the pump signal, apply a desired polarization to the pump signal, and amplify the pump signal.

Figure 7A:
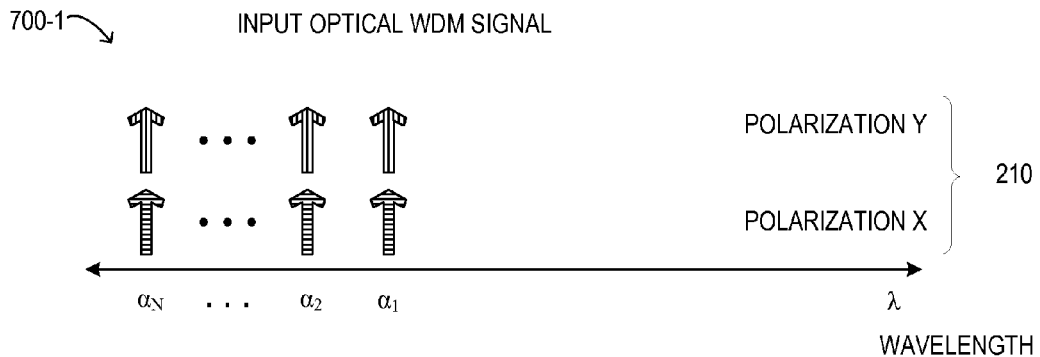
FIGS. 7A-7F are wavelength spectra of signals occurring in an optical amplifier.
Figure 7B:
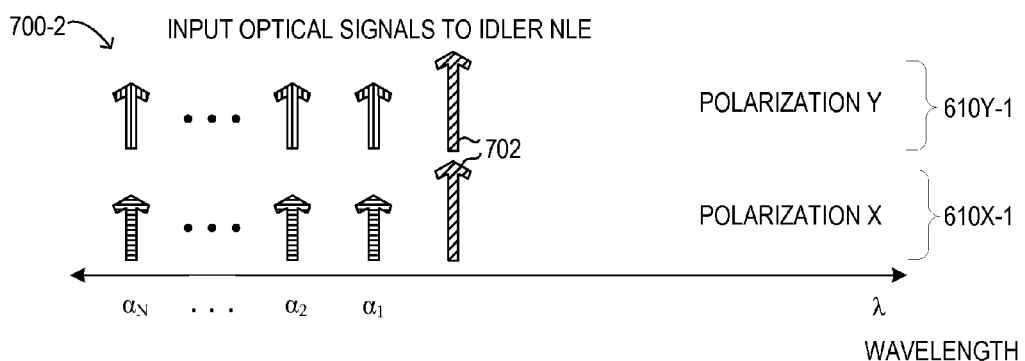
Figure 7C:
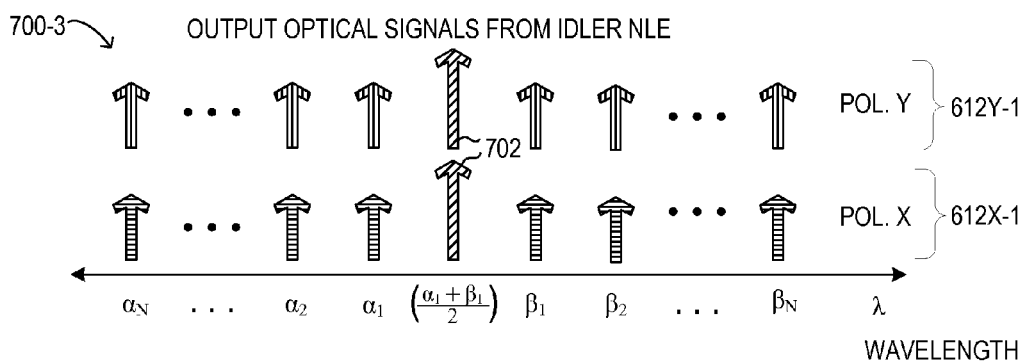
Figure 7D:
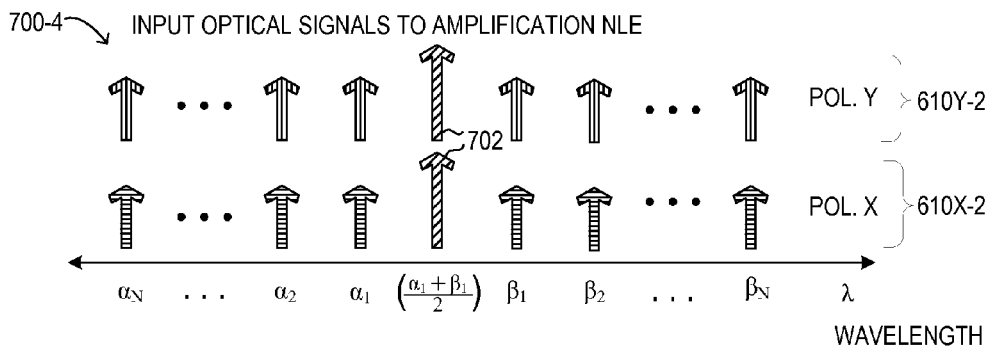

In FIG. 3A, regulation stage 320-1 outputs optical link 328 to circulator 312-2, which outputs the received optical signal to NLE amplification stage 314-2 at optical link 336-2 (see also FIG. 7D). Circulator receives the amplified optical signal from NLE amplification stage 314-2 via optical link 336-2 and outputs the amplified optical signal to optical link 340 (see also FIG. 7E). At tap 302-2, optical link 334 provides the amplified optical signal to feed forward phase-power monitor 316, which communicates with controller 330 via control link 332. Tap 302-2 also outputs the amplified optical signal to WSS 304-2, which may select wavelengths corresponding to input channels 210 for output and may block out other undesired wavelengths, such as the pump signal and the idler signals to generate output signals 214 (see also FIG. 7F).

Referring now to FIG. 3B, selected elements of an embodiment of low noise phase-sensitive optical amplifier 300-2 to provide low-noise optical phase-sensitive amplification are depicted. In one embodiment, optical amplifier 300-2 may support dual-polarization modulation formats. In FIG. 3A, optical amplifier 300-2 is shown in a schematic representation and is not drawn to scale. It is noted that, in different embodiments, optical amplifier 300-2 may be operated with additional or fewer elements. In FIG. 3B, optical amplifier 300-2 is described with respect to input optical WDM signals represented by N number of input channels 210 (see FIG. 2). Although fixed grid WDM input channels 210 are shown herein for descriptive purposes, it is noted that other spectral channel arrangements, such as flex-grid channel spacing, may be practiced in particular embodiments. Also in FIG. 3B, solid lines represent optical paths, while dashed lines represent electrical connections.

In FIG. 3B, optical amplifier 300-2 operates in a similar manner to optical amplifier 300-1 in FIG. 3A, where like numbered elements are described above. In optical amplifier 300-2, however, pump regulation 324 has been omitted and the original pump signal is directly routed to both NLE idler stage 314-1 and NLE amplification stage 314-2. Specifically, in FIG. 3B, pump 308 outputs a pump signal to tap 302-3, which splits the pump signal to coupler 310-1 (for NLE idler stage 314-1) and to coupler 310-2 (for NLE amplification stage 314-2). In this manner, a suitable pump signal is provided in optical amplifier 300-2 to both NLE stages without relying on additional optical components for pump regeneration.

Figure 4A:
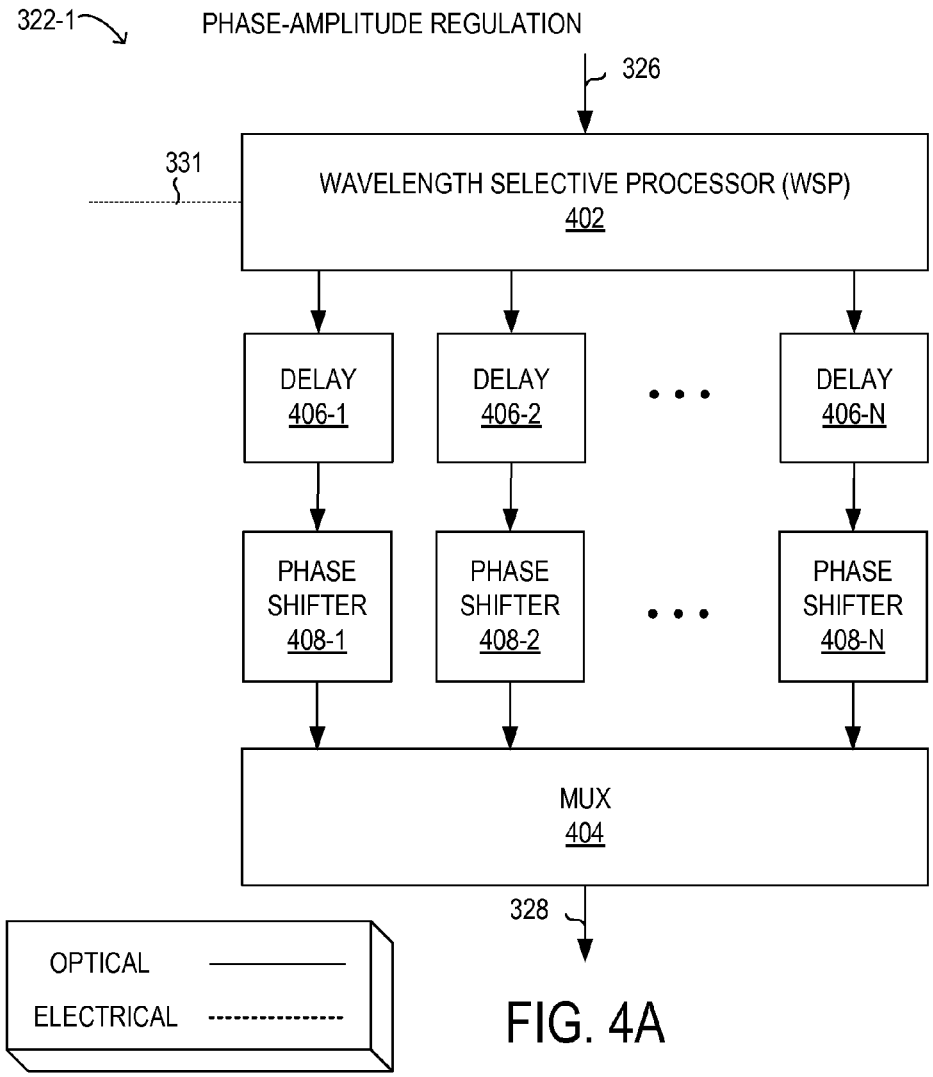
FIG. 4A is a block diagram of selected elements of an embodiment of a phase-amplitude regulation stage.

Referring now to FIG. 4A, selected elements of an embodiment of phase-amplitude regulation 322-1 to control phase-amplitude for low noise amplification in optical amplifier 300 are depicted (see also FIGS. 3A and 3B). As shown, phase-amplitude regulation 322-1 receives the wavelengths corresponding to input channels 210, the pump signal, and the idler signals from NLE idler stage 314-1 via optical link 326 (see also FIG. 7C) at WSP 402.

WSP 402 may further receive instructions from controller 330 via control link 331. In phase-amplitude regulation 322-1, WSP 402 may perform amplitude equalization for the wavelengths corresponding to input channels 210. For example, WSP 402 may equalize all wavelengths for input channels 210 to each other. In another example, WSP 402 may equalize each idler signal to a respective input channel wavelength. Various combinations of equalizations may be implemented at WSP 402. In certain embodiments, pre-equalization may be performed using attenuation at WSS 304-1, prior to equalization at WSP 402. Then, WSP 402 may demultiplex N internal signals corresponding to a signal pair for each of input channels 210 and a respective idler signal to perform phase regulation. These input channel-idler signal pairs may be then routed along N individual optical paths for individual phase regulation.

Subsequent to WSP 402, each wavelength may be individually processed with delay 406 and phase shifter 408 to achieve a desired phase, as determined by controller 330 via control link 331. Delay 406 may enable synchronization of the optical path length differences between input channel-idler signal pairs. It is noted that in certain embodiments, delay 406 may be optional or may introduce zero delay. The amount of delay may depend upon a physical layout of optical amplifier 300 or may compensate for manufacturing tolerances of different optical components used in optical amplifier 300. Phase shifter 408 may be an optical phase shifter that receives a desired phase shift as input and applies the phase shift irrespective of wavelength. The desired phase shift may be received via control link 331. Thus, delay 406-1 and phase shifter 408-1 may correspond to a first input channel-idler signal pair, delay 406-2 and phase shifter 408-2 may correspond to a second input channel-idler signal pairs, and so on, up to delay 406-N and phase shifter 408-N corresponding to an Nth input channel-idler signal pair. Then, MUX 404 may multiplex the N input channel-idler signal pairs and output the combined optical signal via optical link 328.

Figure 4B:
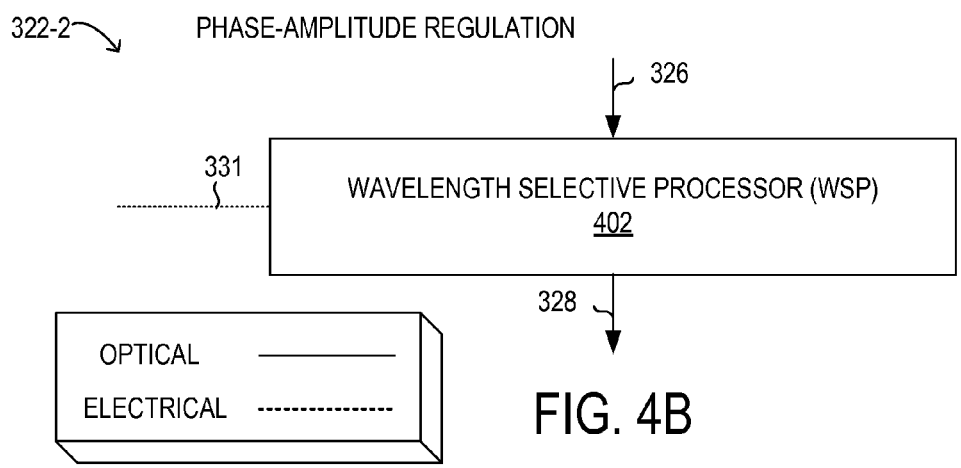
FIG. 4B is a block diagram of selected elements of an embodiment of a phase-amplitude regulation stage.

Referring now to FIG. 4B, selected elements of an embodiment of phase-amplitude regulation 322-2 to control phase-amplitude for low noise amplification in optical amplifier 300 are depicted (see also FIGS. 3A and 3B). As shown, phase-amplitude regulation 322-2 receives the wavelengths corresponding to input channels 210, the pump signal, and the idler signals from NLE idler stage 314-1 via optical link 326 (see also FIG. 7C) at WSP 402. WSP 402 may further receive instructions from controller 330 via control link 331. In phase-amplitude regulation 322-2, WSP 402 may perform equalization and phase adjustment, according to instructions or input via control link 331. In contrast to phase-amplitude regulation 322-1, the use of WSP 402 in phase-amplitude regulation 322-2 may represent a simpler embodiment with fewer optical components. However, depending on a processing bandwidth available to WSP 402, phase-amplitude regulation 322-2 may be limited to processing input channels 210 exhibiting lower data rates, while phase-amplitude regulation 322-1 may be used for higher data rates.

In FIG. 4B, WSP 402 may select which portions of the received signal from optical link 326 are to be amplified using FWM. Such selection may be made based on, for example, wavelength. For example, generation of idler signals NLE idler stage 314-1 may have caused unnecessary or unused idler signals for the purposes of amplification. Thus, WSP 402 may be configured to filter out these unused idler signals. WSP 402 may be implemented in any suitable manner to perform optical switching according to the present disclosure. For example, WSP 402 may include one or more WSSs implemented by any suitable mechanism, including optical components. Furthermore, WSP 402 may include modules, circuitry, or software configured to adjust phase and power levels of components of signals. For example, the phases of input signal 210, the pump signal, and the idler signal may be adjusted by WSP 402 to facilitate FWM. In addition, WSP 402 may include automation software configured to control the operation of wavelength selective switches. Any suitable automation software may be used. The automation software may include instructions resident upon a computer-readable medium for execution by a processor. WSP 402 may include a microprocessor, microcontroller, DSP, ASIC, or any other digital or analog circuitry for executing the instructions resident upon a computer-readable medium or for otherwise performing control of wavelength selective switches. Controller 330 may be configured to adjust the operation of WSP 402, such as adjustment of power or phases of signals received by WSP 402, or adjustment of signals that will be filtered by WSP 402. Furthermore, WSP 402 may be adjusted to pre-compensate input signals for the input signals' residual chromatic dispersion or for dispersion slope of HNLF resident within non-linear elements. Such adjustments may be based upon, for example, the nature or kind of input channels 210, detected output of WSP 402, or detected output of optical amplifier 300.

If input channels 210 include WDM signals, WSP 402 may be configured to select a range including the WDM signals to be amplified, the pump signal, and the range of idler signals corresponding to each of the WDM signals.

Figure 5A:
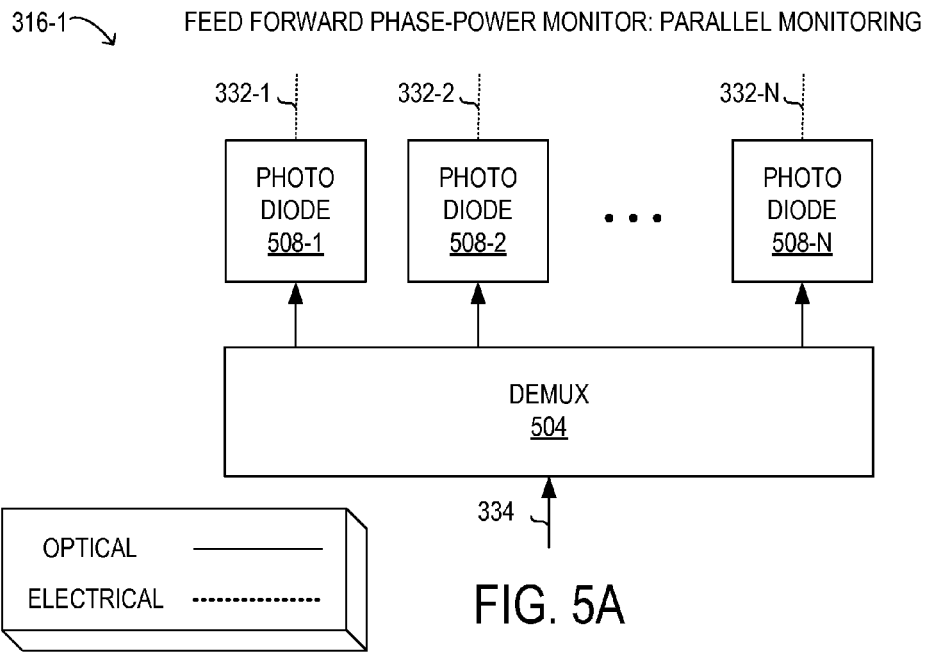
FIG. 5A is a block diagram of selected elements of an embodiment of a feed forward phase-power monitor.

Referring now to FIG. 5A, selected elements of an embodiment of feed forward phase-power monitor 316-1 to monitor phase and power at an output of optical amplifier 300 are depicted (see also FIGS. 3A and 3B). As shown, feed forward phase-power monitor 316-1 represents an embodiment implementing parallel monitoring where each wavelength of N output channels 214 is routed along a separate optical path (see also FIG. 7E). In feed forward phase-power monitor 316-1, output channels 214 are received via optical link 334 and are demultiplexed at demux 504 into N optical paths, corresponding to an individual wavelength. Each optical path is routed to an individual photo diode 508, which outputs a power signal over a control link 332 to controller 330. Thus, output channel 214-1 is monitored by photodiode 508-1 to control link 332-1, output channel 214-2 is monitored by photodiode 508-2 to control link 332-2, and so on, up to output channel 214-N monitored by photodiode 508-N to control link 332-N. In certain embodiments, photodiode 508 may include an electrical amplifier to provide a suitable electrical signal to controller 330.

Figure 5B:
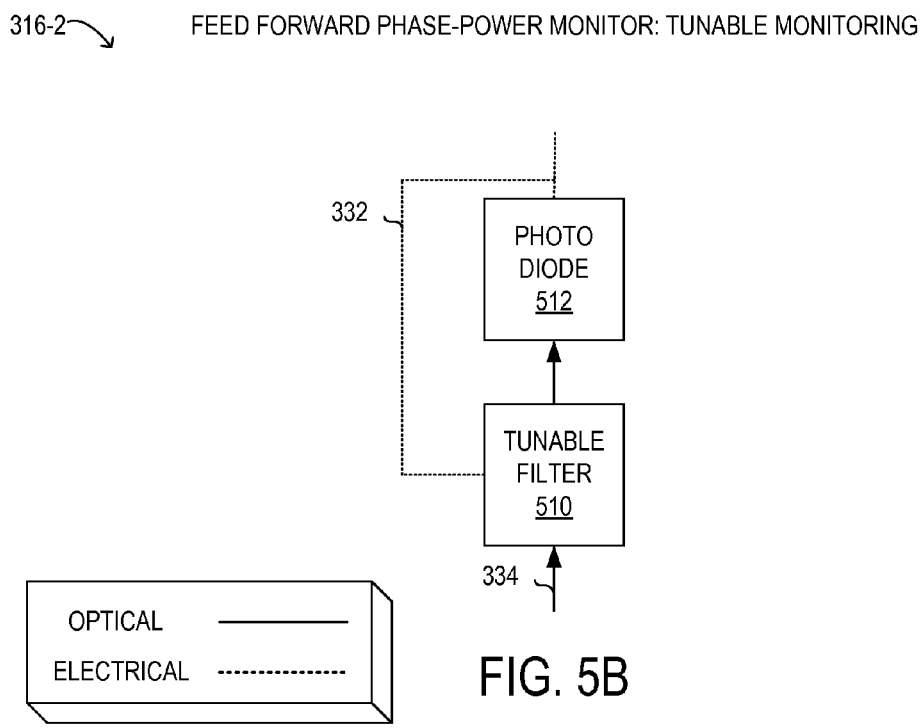
FIG. 5B is a block diagram of selected elements of an embodiment of a feed forward phase-power monitor.

Referring now to FIG. 5B, selected elements of an embodiment of feed forward phase-power monitor 316-2 to monitor phase and power at an output of optical amplifier 300 are depicted (see also FIGS. 3A and 3B). As shown, feed forward phase-power monitor 316-2 represents an embodiment implementing tunable monitoring where tunable filter 510 locks on to and passes an individual wavelength of output channels 214 and photodiode 512 outputs to control link 332. Control link 332 may be bidirectional and may provide the tuning wavelength to tunable filter 510. In certain embodiments, photodiode 508 may include an electrical amplifier to provide a suitable electrical signal to controller 330.

Thus, in comparison to feed forward phase-power monitor 316-1 in FIG. 5A, feed forward phase-power monitor 316-2 may represent a simpler embodiment with fewer optical components and fewer control links to controller 330. However, a response time of feed forward phase-power monitor 316-2 may be greater than for feed forward phase-power monitor 316-1, which may determine a particular application or optical network configuration where feed forward phase-power monitor 316-2 is suitable for use. Due to the time lag in locking into and filtering a given wavelength channel by tunable filter 510, for fastest response times, such as high bandwidth applications, feed forward phase-power monitor 316-1 may be more suitable than feed forward phase-power monitor 316-2.

Figure 6:
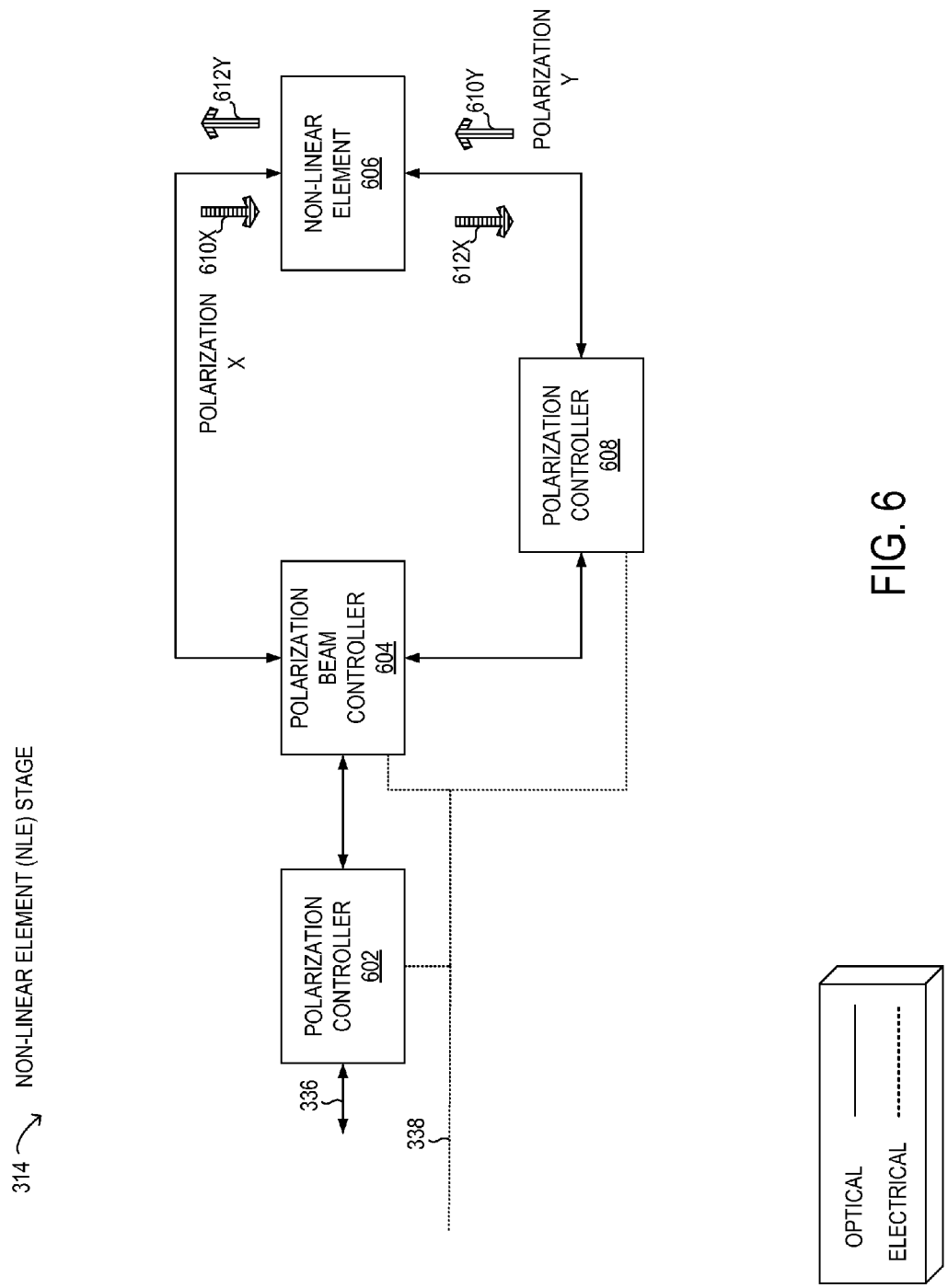
FIG. 6 is a block diagram of selected elements of an embodiment of a non-linear element stage.

Referring now to FIG. 6, selected elements of an embodiment of NLE stage 314 are depicted. As shown, NLE stage 314 may represent an embodiment of NLE idler stage 314-1 or NLE amplification stage 314-2 (see also FIGS. 3A and 3B). Although the optical functionality of NLE idler stage 314-1 and NLE amplification stage 314-2 are different, NLE stage 314 may represent a generalized component for performing optical mixing on dual-polarized optical signals. Thus, the structure depicted in NLE stage 314 may be used to generate the idler signal in NLE idler stage 314-1. Furthermore, the structure depicted in NLE stage 314 may be used for phase-sensitive amplification in NLE amplification stage 314-2 using FWM after idler signals are present. It is noted that different specific components and other modifications may be made to NLE stage 314 for particular uses in different applications of optical mixing.

In FIG. 6, NLE stage 314 includes polarization controllers 602 and 608, which may adjust the X-polarization and Y-polarization components of input signals on optical link 336 with respect to polarization beam controller 604. In the case of NLE idler stage 314-1, the polarization may be adjusted to maximize or increase the effects of idler signal generation by NLE 606. Such adjustments may include a polarization shifting of the X-polarization and Y-polarization components. Furthermore, polarization controllers 602 and 608 may be configured to adjust such components after an idler signal has been generated for the components. Polarization controllers 602 and 608 may be implemented in any suitable manner to perform such adjustments. Polarization controllers 602 and 608 may be communicatively coupled to controller 330 via control link 338. Controller 330 may be configured to adjust the operation of polarization controllers 602 and 608. Such adjustments may be based upon, for example, the nature or kind of input channels 210, detected output of polarization controllers 602 and 608, or detected output of optical amplifier 300.

Polarization controller 602 may perform adjustments on the X-polarization and Y-polarization components and output the results to polarization beam controller 604. Polarization beam controller 604 may split an input optical signal according to X-polarization and Y-polarization components, and may combine into an output optical signal X-polarization and Y-polarization components that were previously split. For example, input channels 210 may include an X-polarization component and a Y-polarization component. Thus, polarization beam controller 604 may output the X-polarization component of the combination of input channels 210 and the pump signal and to output the Y-polarization component of the combination of input channels 210 and the pump signal. Polarization beam controller 604 may output each polarization bi-directionally to NLE 606 for signal conversion. For example, X-polarization component 610X may be provided to NLE 606 in the clockwise circuit loop in FIG. 6 and Y-polarization component 610Y may be provided to NLE 606 in the counter-clockwise circuit loop. Then, after FWM within NLE 606, X-polarization component 612X emerges from NLE 606 in the clockwise direction and Y-polarization component 612Y emerges in the counter-clockwise direction. Polarization beam controller 604 may be implemented in any suitable manner for splitting its input signals into X-polarization and Y-polarization components. Polarization beam controller 604 may be communicatively coupled to controller 330. Controller 330 may adjust the operation of polarization beam controller 604. Such adjustments may be based upon, for example, the nature or kind of input channels 210, detected output of optical amplifier 300, or detected output of polarization beam controller 604.

Polarization controller 608 may receive optical signals from polarization beam controller 214 or NLE 606 and adjust the polarization components of the optical signals and output the adjusted optical signals to NLE 606 or polarization beam controller 604, respectively. Further, polarization beam controller 604 may combine X-polarization component 612X and Y-polarization component 612Y after passing bi-directionally through NLE 606. Polarization beam controller 604 may receive X-polarization component 612X from polarization controller 608. Furthermore, polarization beam controller 604 may output the combination of X-polarization component 612X and Y-polarization component 612Y to polarization controller 602.

NLE 606 may bi-directionally provide signal conversion for optical signals passing through NLE 606. NLE 606 may include an optical NLE. Such signal conversion may be performed on signals passing simultaneously through optical NLE 606 in each direction, such as X-polarization component 610X and Y-polarization component 610Y from polarization beam controller 604. In one embodiment, any NLE that can support bi-directional propagation and non-linear processing may be used to implement NLE 606. For example, NLE 606 may include an optical, highly non-linear fiber ("HNLF") of length of two hundred meters, non-linear coefficient (y=9.2 (1/W·km)), dispersion slope (S=0.018 ps/km/nm2), and zero-dispersion wavelength ("ZDW") at 1550 nm. In another example, NLE 606 may include waveguides to produce the desired output. In yet other examples, NLE 606 may include a silicon waveguide, III-V waveguide, or periodically poled Lithium Niobate ("PPLN").

NLE 606 may provide optical signal conversion based upon the nature of input signals. In the case of NLE idler stage 314-1, the input signals may include the combination of input channels 210 and the pump signal from pump 308, where NLE 606 may cause an idler signal to be added to the combination. The spectral properties of the idler signal are described in further detail with respect to FIG. 7C. When input channels 210 include multiple WDM components, NLE 606 may generate an idler signal for each such WDM component. Each idler signal and the corresponding WDM component may be equidistant, or nearly equidistant, from the pump signal in terms of wavelength. Thus, the WDM components of input signal 202 and the corresponding idler signals may be symmetric, or nearly symmetric, around the pump signal with respect to wavelength. In the case of NLE amplification stage 314-2, NLE 606 may bi-directionally amplify signals using FWM. Such signals may include both input channels 210 and corresponding idler signals. In one embodiment, NLE 606 may perform non-degenerate FWM. Such bi-directional amplification may be performed on signals passing simultaneously through NLE 606 in each direction, as described above with respect to NLE idler stage 314-1. The FWM performed by NLE 606 may utilize the equidistant, or nearly equidistant, arrangement of input channels 210 and the idler signals around the pump signal. Furthermore, the FWM performed by NLE 606 may utilize the performance of the idler signals as conjugate signals to input channels 210. When input channels 210 include WDM signals, NLE 606 may amplify the range of WDM signals and the range of the idler signals corresponding to the WDM signals.

By performing separate processing of X-polarization and Y-polarization components using NLE stage 314, optical amplifier 300 may avoid crosstalk or path mismatch between the components. Further, by performing the processing bi-directionally using NLE stage 314, optical amplifier 300 may achieve hardware efficiency by lessening the need for additional optical NLEs.

Referring now to FIGS. 7A through 7F, selected elements of embodiments of wavelength spectra 700 are depicted. The wavelength spectra 700 depict amplitude and polarization versus wavelength of various optical signals occurring in optical amplifier 300, as will be described in further detail. Each input channel is shown as an arrow whose relative height indicates a signal amplitude and whose position indicates a wavelength. A shading and absolute position of each arrow may correspond to a given polarization, as indicated in each respective figure and described in detail below. It is noted that wavelength spectra 700 are shown with arbitrary axes for schematic representation and are not drawn to scale.

In FIG. 7A, wavelength spectra 700-1 depicts a general spectra for input optical WDM signals to optical amplifier 300. The signals depicted in wavelength spectra 700-1 represent input channels 210, for example, at an input to coupler 310-1. The WDM signals are shown at wavelengths $\alpha_1$, $\alpha_2$, and so on, up to $\alpha_N$, where N is an integer greater than or equal to 1. It is noted that a wavelength difference $\alpha_n - \alpha_{n-1}$ for any n={1 . . . N} may be constant or substantially constant. As shown, the input optical WDM signals have dual-polarization, shown as X-polarization component and Y-polarization component which are combined for each channel in input channels 210.

In FIG. 7B, wavelength spectra 700-2 depicts a general spectra for input optical signals to the idler NLE (optical input at NLE idler stage 314-1) in optical amplifier 300. The signals depicted in wavelength spectra 700-2 represent input channels 210 that include input channels at wavelengths $\alpha_1$ to $\alpha_N$ with added pump signal 702. It is noted that pump signal 702 may be polarized at 45° such that a relative polarization angle of pump signal 702 with respect to X-polarization component 610X-1 and Y-polarization component 610Y-1 is equal.

In FIG. 7C, wavelength spectra 700-3 depicts a general spectra for output optical signals from the idler NLE (optical output from NLE idler stage 314-1) in optical amplifier 300. The signals depicted in wavelength spectra 700-3 represent input channels 210 that include input channels at wavelengths $\alpha_1$ to $\alpha_N$ with added pump signal 702. Additionally, in wavelength spectra 700-3, idler signals have been added at wavelengths $\beta_1$, $\beta_2$, and so on, up to $\beta_N$. The wavelength spacing between successive idler signals may correspond to the wavelength spacing between corresponding input signals 210. In other words, the idler signals may be symmetrical about pump signal 702 to input signals 210. The spectral position of pump signal 702 may be given by $(\alpha_1+\beta_1)/2$. The signals in wavelength spectra 700-3 include X-polarization component 612X-1 and Y-polarization component 612Y-1.

In FIG. 7D, wavelength spectra 700-4 depicts a general spectra for input optical signals to the amplification NLE (optical input to NLE amplification stage 314-2) in optical amplifier 300. The signals depicted in wavelength spectra 700-4 represent input channels 210 that include input channels at wavelengths $\alpha_1$ to $\alpha_N$ with added pump signal 702. Additionally, in wavelength spectra 700-4, idler signals are included at wavelengths $\beta_1$ to $\beta_N$. Thus, in certain embodiments, wavelength spectra 700-3 and 700-4 may be equivalent. In certain embodiments, wavelength spectra 700-4 may show uniform amplitude according to an equalization that is performed. The signals in wavelength spectra 700-4 include X-polarization component 610X-2 and Y-polarization component 610Y-2.

Figure 7E:
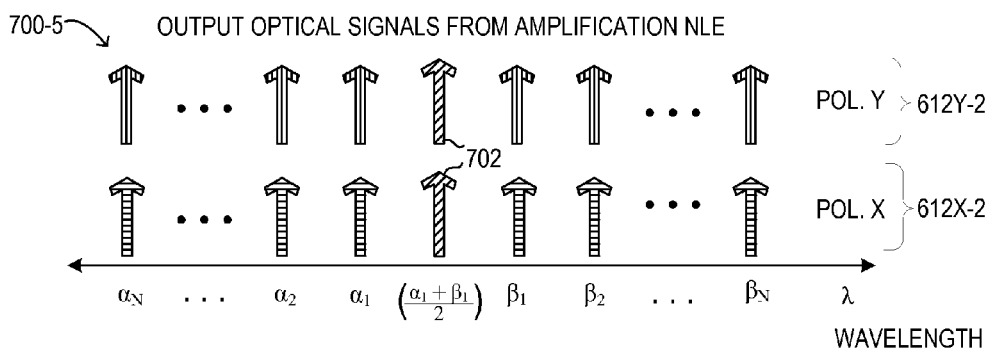

In FIG. 7E, wavelength spectra 700-5 depicts a general spectra for output optical signals from the amplification NLE (optical output from NLE amplification stage 314-2) in optical amplifier 300. The signals depicted in wavelength spectra 700-5 represent input channels 210 that include input channels at wavelengths $\alpha_1$ to $\alpha_N$ with added pump signal 702. Additionally, in wavelength spectra 700-5, idler signals are present at wavelengths $\beta_1$ to $\beta_N$. As shown, wavelength spectra 700-5 may an amplitude reduction for pump signal 702 with an increase in amplitude of input signals 210 and the idler signals, according to a phase-sensitive amplification that is performed at NLE amplification stage 314-2. The signals in wavelength spectra 700-5 include X-polarization component 612X-2 and Y-polarization component 612Y-2.

Figure 7F:
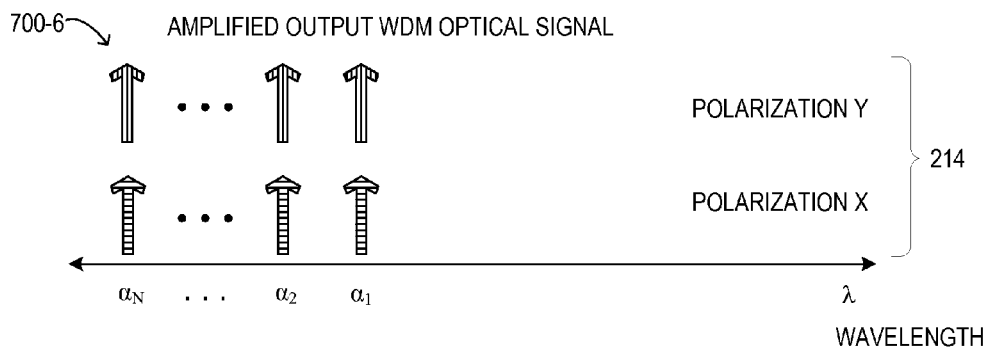

In FIG. 7F, wavelength spectra 700-6 depicts a general spectra for amplified output WDM optical signals from the amplification NLE (optical output from NLE amplification stage 314-2) in optical amplifier 300. The signals depicted in wavelength spectra 700-6 represent amplified channels 214 that include input channels at wavelengths $\alpha_1$ to $\alpha_N$ without pump signal 702 or idler signals. The amplitude of the WDM signals in wavelength spectra 700-6 is greater than in wavelength spectra 700-1.

Figure 8:
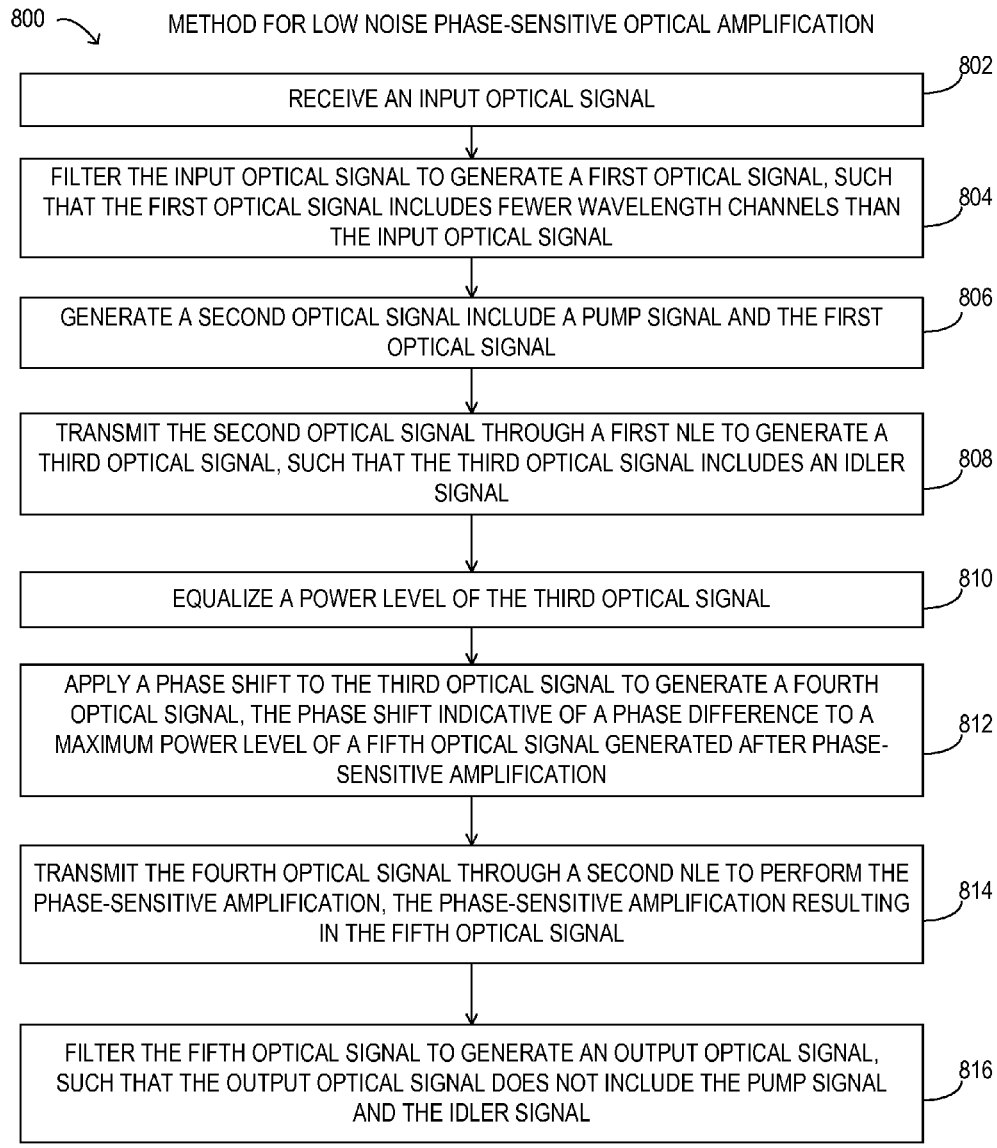
FIG. 8 is a flow diagram of selected elements of an embodiment of a method for low noise phase-sensitive optical amplification.

Referring now to FIG. 8, a block diagram of selected elements of an embodiment of method 800 for low noise phase-sensitive optical amplification, as described herein, is depicted in flowchart form. Method 800 may be performed using optical amplifier 300. It is noted that certain operations described in method 800 may be optional or may be rearranged in different embodiments.

Method 800 may begin by receiving (operation 802) an input optical signal. The input optical signal is filtered (operation 804) to generate a first optical signal, such that the first optical signal includes fewer wavelength channels than the input optical signal. It is noted that operation 804 may be omitted in various embodiments. A second optical signal is generated (operation 806) including a pump signal and the first optical signal. The second optical signal is transmitted (operation 808) through a first NLE to generate a third optical signal, such that the third optical signal includes an idler signal. A power level of the third optical signal is equalized (operation 810). A phase shift is applied (operation 812) to the third optical signal to generate a fourth optical signal, the phase shift indicative of a phase difference to a maximum power level of a fifth optical signal generated after phase-sensitive amplification. The fourth optical signal is transmitted (operation 814) through a second NLE to perform the phase-sensitive amplification, the phase-sensitive amplification resulting in a fifth optical signal. The fifth optical signal is filtered (operation 816) to generate an output optical signal, such that the output optical signal does not include the pump signal and the idler signal.

As disclosed herein, methods and systems for amplifying optical signals include generating idler signals for input signals using a pump signal at a first non-linear element (NLE). Phase and amplitude regulation is performed using the output from the first NLE. Optical power monitoring of the input signals may be used for power equalization. The phase regulation may use input from a feed forward phase-power monitoring of the output phase-sensitive amplified signal. After phase regulation the phase-sensitive amplified signal is generated at a second NLE using the pump signal. Optical power monitoring of the input signals may be used for power equalization.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for amplifying optical signals, comprising:
   receiving a first optical signal for amplification;
   generating a second optical signal including a pump signal and the first optical signal;
   transmitting the second optical signal through a first non-linear element to generate a third optical signal, wherein the third optical signal includes an idler signal;
   equalizing a power level of the third optical signal;
   applying a phase shift to the third optical signal to generate a fourth optical signal, the phase shift indicative of a phase difference to a maximum power level of a fifth optical signal generated after phase-sensitive amplification; and
   transmitting the fourth optical signal through a second non-linear element to perform the phase-sensitive amplification, the phase-sensitive amplification resulting in the fifth optical signal.

2. The method of claim 1, wherein the first optical signal includes a plurality of wavelength channels, wherein the wavelength channels are wavelength division multiplexed.

3. The method of claim 2, further comprising:
   receiving an input optical signal;
   filtering the input optical signal to generate the first optical signal, wherein the first optical signal includes fewer wavelength channels than the input optical signal; and
   filtering the fifth optical signal to generate an output optical signal, wherein the output optical signal does not include the pump signal and the idler signal.

4. The method of claim 2, wherein equalizing a power level of the third optical signal includes:
based on optical power monitoring of the first optical signal, equalizing the plurality of wavelength channels in the first optical signal to each other.

5. The method of claim 2, wherein equalizing a power level of the third optical signal includes:
based on optical power monitoring of the first optical signal, equalizing a wavelength channel in the first optical signal to a corresponding wavelength channel in the idler signal.

6. The method of claim 2, wherein applying the phase shift to the third optical signal includes:
splitting each of the wavelength channels into separate optical paths;
optically shifting, in parallel in each optical path, a phase of each of the wavelength channels independently of other wavelength channels; and
combining the wavelength channels to generate the fourth optical signal.

7. The method of claim 2, further comprising:
monitoring the phase difference to the maximum power level of the fifth optical signal.

8. The method of claim 7, wherein monitoring the phase difference to the maximum power level of the fifth optical signal includes:
splitting each of the wavelength channels in the fifth optical signal corresponding to the first optical signal into separate optical paths; and
generating, in parallel in each optical path, a power signal of each of the wavelength channels independently of other wavelength channels.

9. The method of claim 7, wherein monitoring the phase difference to the maximum power level of the fifth optical signal includes:
applying a tunable filter to the fifth optical signal, wherein the tunable filter filters out a first wavelength channel; and
generating a power signal for the first wavelength channel.

10. The method of claim 2, wherein each of the wavelength channels are modulated using orthogonal dual-polarization modulation including an X-polarization component and a Y-polarization component.

11. The method of claim 2, wherein the wavelength channels are modulated using at least one of: phase-shift keying (PSK); frequency-shift keying (FSK); amplitude-shift keying (ASK); and quadrature amplitude modulation (QAM).

12. An optical amplifier, comprising:
a pump source to generate a pump signal;
a coupler to combine the pump signal to a first optical signal to generate a second optical signal;
a first non-linear element (NLE) stage to generate a third optical signal from the second optical signal, the third optical signal including an idler signal;
a regulation stage to perform phase-amplitude regulation on the third optical signal to generate a fourth optical signal, wherein the phase-amplitude regulation includes equalizing a power level of the third optical signal and applying a phase shift to the third optical signal, the phase shift indicative of a phase difference to a maximum power level of a fifth optical signal generated after phase-sensitive amplification;
a second NLE stage to generate the fifth optical signal from the fourth optical signal, the second NLE stage performing the phase-sensitive amplification on the fourth optical signal; and
a controller to:
based on the phase difference to the maximum power level of the fifth optical signal, determine the phase shift; and
communicate the phase shift to the regulation stage.

13. The optical amplifier of claim 12, wherein the first optical signal includes a plurality of wavelength channels, wherein the wavelength channels are wavelength division multiplexed.

14. The optical amplifier of claim 13, further comprising:
an optical input to receive an input optical signal;
a first filter to filter the input optical signal to generate the first optical signal, wherein the first optical signal includes fewer wavelength channels than the input optical signal; and
a second filter to filter the fifth optical signal to generate an output optical signal, wherein the output optical signal does not include the pump signal and the idler signal.

15. The optical amplifier of claim 13, wherein the regulation stage equalizing a power level of the third optical signal includes the regulation stage:
based on optical power monitoring of the first optical signal, equalizing the plurality of wavelength channels in the first optical signal to each other.

16. The optical amplifier of claim 13, wherein the regulation stage equalizing a power level of the third optical signal includes the regulation stage:
based on optical power monitoring of the first optical signal, equalizing a wavelength channel in the first optical signal to a corresponding wavelength channel in the idler signal.

17. The optical amplifier of claim 13, wherein the regulation stage applying the phase shift to the third optical signal includes the regulation stage:
splitting each of the wavelength channels into separate optical paths;
optically shifting, in parallel in each optical path, a phase of each of the wavelength channels independently of other wavelength channels; and
combining the wavelength channels to generate the fourth optical signal.

18. The optical amplifier of claim 13, further comprising a feed forward phase-power monitor to:
monitor the phase difference to the maximum power level of the fifth optical signal; and
communicate the phase difference to the controller.

19. The optical amplifier of claim 18, wherein the feed forward phase-power monitor to monitor the phase difference to the maximum power level of the fifth optical signal includes the feed forward phase-power monitor to:
split each of the wavelength channels in the fifth optical signal corresponding to the first optical signal into separate optical paths; and
generate, in parallel in each optical path, a power signal of each of the wavelength channels independently of other wavelength channels.

20. The optical amplifier of claim 18, wherein the feed forward phase-power monitor to monitor the phase difference to the maximum power level of the fifth optical signal includes the feed forward phase-power monitor to:
apply a tunable filter to the fifth optical signal, wherein the tunable filter filters out a first wavelength channel; and
generate a power signal for the first wavelength channel.

21. The optical amplifier of claim 13, wherein each of the wavelength channels are modulated using orthogonal dual-polarization modulation including an X-polarization component and a Y-polarization component.

22. The optical amplifier of claim 13, wherein the wavelength channels are modulated using at least one of: phase-shift keying (PSK); frequency-shift keying (FSK); amplitude-shift keying (ASK); and quadrature amplitude modulation (QAM).

23. An optical communication system comprising:
   a transmitter to transmit an optical signal over an optical signal transmission path;
   a receiver to receive the optical signal from the optical signal transmission path; and
   an optical amplifier in the optical signal transmission path, the optical amplifier further comprising:
      a pump source to generate a pump signal;
      a coupler to combine the pump signal to a first optical signal to generate a second optical signal;
      a first non-linear element (NLE) stage to generate a third optical signal from the second optical signal, the third optical signal including an idler signal;
      a regulation stage to perform phase-amplitude regulation on the third optical signal to generate a fourth optical signal, wherein the phase-amplitude regulation includes equalizing a power level of the third optical signal and applying a phase shift to the third optical signal, the phase shift indicative of a phase difference to a maximum power level of a fifth optical signal generated after phase-sensitive amplification;
      a second NLE stage to generate the fifth optical signal from the fourth optical signal, the second NLE stage performing the phase-sensitive amplification on the fourth optical signal; and
      a controller to:
         based on the phase difference to the maximum power level of the fifth optical signal, determine the phase shift; and
         communicate the phase shift to the regulation stage.

24. The optical communication system of claim 23, wherein the first optical signal includes a plurality of wavelength channels, wherein the wavelength channels are wavelength division multiplexed.

25. The optical communication system of claim 24, wherein the optical amplifier further comprises:
   an optical input in the optical transmission path to receive an input optical signal;
   a first filter to filter the input optical signal to generate the first optical signal, wherein the first optical signal includes fewer wavelength channels than the input optical signal;
   a second filter to filter the fifth optical signal to generate an output optical signal, wherein the output optical signal does not include the pump signal and the idler signal; and
   an optical output in the optical transmission path to transmit the output optical signal.

26. The optical communication system of claim 24, wherein the regulation stage equalizing a power level of the third optical signal includes the regulation stage:
   based on optical power monitoring of the first optical signal, equalizing the plurality of wavelength channels in the first optical signal to each other.

27. The optical communication system of claim 24, wherein the regulation stage equalizing a power level of the third optical signal includes the regulation stage:
   based on optical power monitoring of the first optical signal, equalizing a wavelength channel in the first optical signal to a corresponding wavelength channel in the idler signal.

28. The optical communication system of claim 24, wherein the regulation stage applying the phase shift to the third optical signal includes the regulation stage:
   splitting each of the wavelength channels into separate optical paths;
   optically shifting, in parallel in each optical path, a phase of each of the wavelength channels independently of other wavelength channels; and
   combining the wavelength channels to generate the fourth optical signal.

29. The optical communication system of claim 24, wherein optical amplifier further comprises a feed forward phase-power monitor to:
   monitor the phase difference to the maximum power level of the fifth optical signal; and
   communicate the phase difference to the controller.

30. The optical communication system of claim 29, wherein the feed forward phase-power monitor to monitor the phase difference to the maximum power level of the fifth optical signal includes the feed forward phase-power monitor to:
   split each of the wavelength channels in the fifth optical signal corresponding to the first optical signal into separate optical paths; and
   generate, in parallel in each optical path, a power signal of each of the wavelength channels independently of other wavelength channels.

31. The optical communication system of claim 29, wherein the feed forward phase-power monitor to monitor the phase difference to the maximum power level of the fifth optical signal includes the feed forward phase-power monitor to:
   apply a tunable filter to the fifth optical signal, wherein the tunable filter filters out a first wavelength channel; and
   generate a power signal for the first wavelength channel.

32. The optical communication system of claim 24, wherein each of the wavelength channels are modulated using orthogonal dual-polarization modulation including an X-polarization component and a Y-polarization component.

33. The optical communication system of claim 24, wherein the wavelength channels are modulated using at least one of: phase-shift keying (PSK); frequency-shift keying (FSK); amplitude-shift keying (ASK); and quadrature amplitude modulation (QAM).

* * * * *